No. 833,133. PATENTED OCT. 9, 1906.
C. M. HOWG.
COMBINED CARPENTER'S TOOL.
APPLICATION FILED JAN. 13, 1906.
2 SHEETS—SHEET 1.
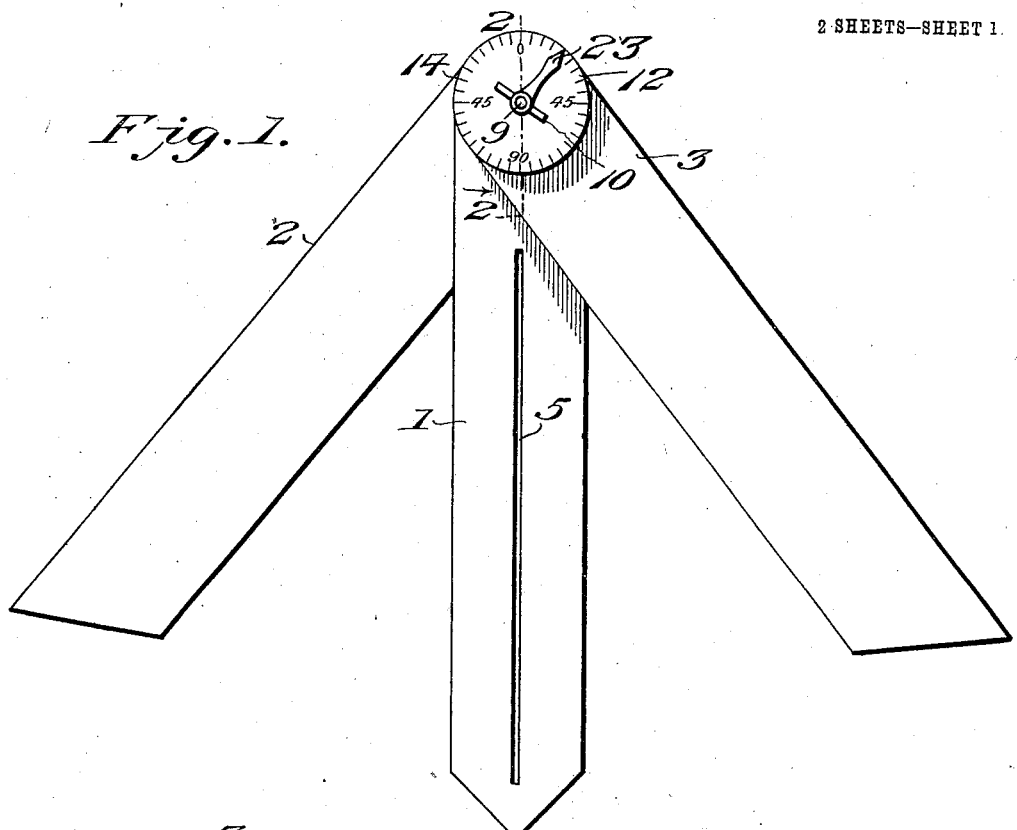
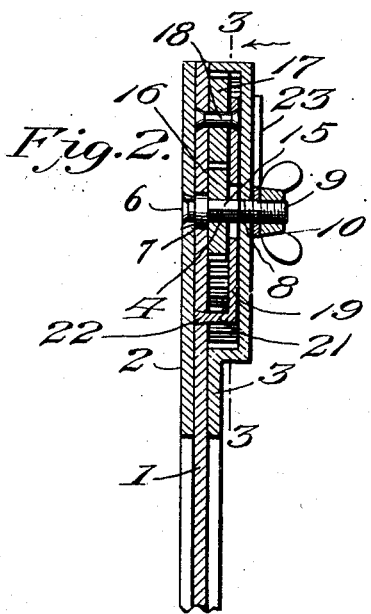
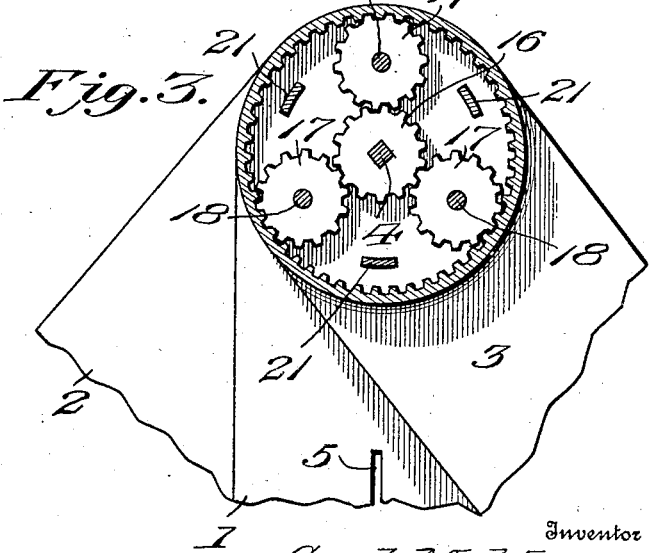
Witnesses
Edwin G. McKee
C. C. Hines
Inventor
Carl M. Howg
By Victor J. Evans
Attorney No. 833,133. PATENTED OCT. 9, 1906.
C. M. HOWG.
COMBINED CARPENTER'S TOOL.
APPLICATION FILED JAN. 13, 1906.

2 SHEETS—SHEET 2.

Witnesses
Edwin G. McKee
C. C. Hines

Inventor
Carl M. Howg
By Victor J. Evans
Attorney

UNITED STATES PATENT OFFICE.

CARL M. HOWG, OF EFFINGTON, SOUTH DAKOTA.

COMBINED CARPENTER'S TOOL.

No. 833,133.　　　　Specification of Letters Patent.　　　　Patented Oct. 9, 1906.

Application filed January 13, 1906. Serial No. 295,991.

*To all whom it may concern:*

Be it known that I, CARL M. HOWG, a citizen of the United States, residing at Effington, in the county of Roberts and State of South Dakota, have invented new and useful Improvements in a Combined Carpenter's Tool, of which the following is a specification.

My invention relates to a combined square and bevel and degree-indicator for use by carpenters and others, and has for its object to provide a simple and effective instrument adapted for use as a square and to be employed for measuring outside and inside corner-angles, bevels, and angular degrees of parts and for determining angles for any kind of work, so that in joining and other similar work the lumber or stock may be laid out and accurately cut, and, further, to provide a device of this kind which may be folded in close compass, so as to be conveniently carried in the pocket or packed in a tool-chest.

Figure 4:
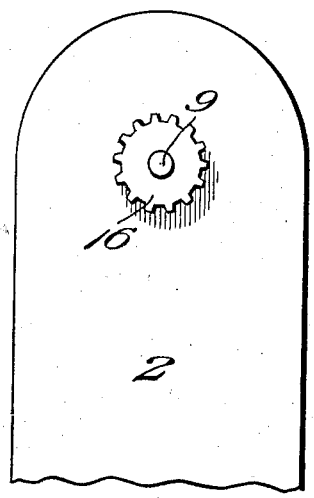
Figure 5:
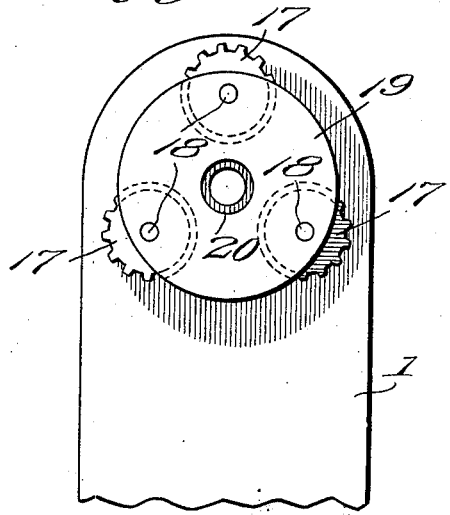
Figure 6:
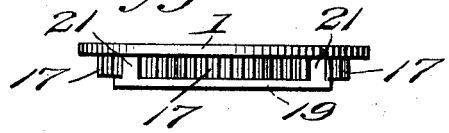
Figure 7:
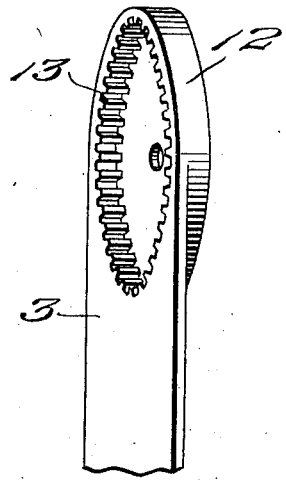
Figure 8:
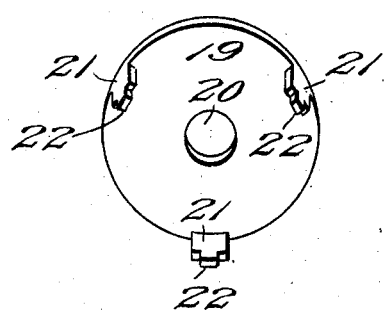

In the accompanying drawings, Figure 1 is a plan view of a combined square and measuring instrument embodying my invention. Fig. 2 is a section, on an enlarged scale, on line 2 2 of Fig. 1. Fig. 3 is a section on line 3 3 of Fig. 2. Fig. 4 is a top plan view of the pivoted end of one of the side arms of the device and main gear of the indicating mechanism. Fig. 5 is a similar view, in bottom plan, of the central arm and attached parts. Fig. 6 is an end edge view of the elements shown in Fig. 5. Fig. 7 is a perspective view of the pivoted end of the other side arm. Fig. 8 is a detail view of the bearing-plate.

The device comprises in its construction three operating-arms—to wit, a main or central arm 1 and side arms 2 and 3. These arms are pivotally connected at one end by a pivot-pin 4, and the central arm 1 is formed with a longitudinal slot 5, through which the point of a pencil may be inserted for inscribing an indicating-line on the work whose angle of cut is to be determined. This slot is also useful in positioning the device for measuring outside corner-angles, as the slot may be engaged with the edge of the work or part to be measured, and thus assist in holding the instrument in position.

The pivot-pin 4 is provided with a winged or rectangular head 6 and rounded portions or journals 7 and 8, on which latter the arms or blades 1 and 3 are respectively mounted to turn, and has a screw-threaded upper end 9 to receive a wing or clamping nut 10, by which the arms or blades may be clamped in adjusted position. The pin extends through the central arm 1 and the side arm 2 and through a gear-casing 12, carried by the other side arm 3, which casing 12 is formed with internal gear-teeth 13 and has its upper wall arranged to form a dial and scale-plate 14, which is provided with graduation-marks concentric with the pivot-pin and having a range of ninety degrees.

The winged or polygonal head portion 6 of the pin 4 extends through a correspondingly-shaped opening in the arm 2, thus rigidly connecting said pin and arm to turn in unison, while the body of the pin is formed between its journals 7 and 8 with a polygonal portion 15, on which is mounted a central gear-wheel 16, which turns with the pin. This gear-wheel 16 meshes with a series of gears 17, arranged equidistantly apart and meshing with the internal gear-teeth 13, so that when the arm 2 is held stationary and the arm 3 swung outwardly motion will be transmitted to move the central arm 1 with the arm 3 and at a decreased rate of speed, the gearing being so proportioned that the central arm 1 will move at one-half the rate of speed of the arm 3.

The gears 17 are mounted on stationary spindles 18, which are journaled at their ends in the central arm 1, and a bearing-plate 19, said plate having a central opening 20, through which the pin 4 extends, and being arranged within the casing 12. At suitable intervals the plate 19 is provided with supporting projections 21, having reduced terminals 22, which are tightly fitted in openings in the central arm 1, thereby firmly and yet loosely holding the said bearing-plate in position. The function of the bearing-plate, in addition to serving as a support for the upper ends of the spindles 18, is to hold the loosely-mounted gear in engaging relation, thus increasing the stability of the structure and reducing wear from loose motion of the parts. It will of course be understood that only one of the gears 17 need be employed, but that a plurality are used in order to equally transmit the bearing strain to the parts of the gearing and further enhance the strength and durability of the structure.

Fitted upon the angular portion of the pin 4 between the wing-nut 10 and dial or face-plate 14 is a hand or pointer 23, which is adapted to turn with said pin and sweep across the face of the dial and register with the degree-marks thereon to indicate the angular arrangement on the arms or blades of the device.

It will be readily understood by reference to the foregoing description, taken in connection with the accompanying drawings, that by holding arm 2 stationary and moving the arm 3 in one direction or the other the arm 1 will be operated to move with the arm 3 at such a relatively lower speed as to maintain the angular relation between all of the arms and that by disposing the arms 2 and 3 at right angles to the arms 1 the device may be employed to serve the function of a square; also, that by arranging the said arms at any angle between the central arm 2 and an angular relation of ninety degrees therewith the device may be employed for measuring inside and outside corner-angles and also for determining the angles of bevels and other angles in degrees, the degree being accurately indicated by the hand or pointer 23. The adjustability of the arms to different relative positions also permits the device to be used for laying off stock at any desired degree or angle within the limits defined, thus rendering the instrument of great value in laying off lines at varying angles to each other and indicating angles at which the stock or lumber is to be cut for joining pieces together in corners and other angle-work. Other uses and advantages of the invention will be apparent to those versed in the art.

By constructing the gearing and pivotal connection as shown and described the intermeshing gears will be concealed and protected from injury by the casing, while the arms may be folded so as to overlie one another, and thereby permit the device to be folded in close compass, so that it may be conveniently carried in the pocket or packed in a tool-chest.

Having thus described the invention, what is claimed as new is—

1. A device of the character described comprising three arms, a pivot-pin fixed to one of the arms and upon which the other arms are journaled, a gear rigidly mounted upon said pivot-pin, gearing between said gear and one of the other arms, and indicating means actuated by said pin for determining the angular arrangement of the arms.

2. A device of the character described comprising a central arm and side arms, a pivot-pin rigidly connected with one of the side arms and upon which the central arm and other side arm are pivotally mounted, gearing between said pin and one of the side arms, whereby when said side arm is held stationary, the central arm will be moved at one-half the rate of speed of the first-named side arm, and indicating means having a movable member automatically operating when the arms are moved to indicate their angular arrangement.

3. A device of the character described comprising a central arm and two side arms, one of said side arms being provided with a gear-casing and a degree-scale, a pivot-pin connecting said arms, gearing between the central arm and casing portion of said side arm for moving the central arm at a decreased rate of speed when said side arm is moved and the other side arm held stationary, said gearing being inclosed by said casing, and a pointer carried by the pivot-pin to coöperate with said degree-scale to indicate the angular relation of the arms.

In testimony whereof I affix my signature in presence of two witnesses.

CARL M. HOWG.

Witnesses:
L. WM. FOSS,
AIMEE L. MACDONALD.